United States Patent
Owen

[11] Patent Number: 5,823,542
[45] Date of Patent: Oct. 20, 1998

[54] SPIRAL WOUND GASKET

[75] Inventor: Richard S. Owen, Houston, Tex.

[73] Assignee: Lamons Metal Gasket Co., Houston, Tex.

[21] Appl. No.: 907,103

[22] Filed: Aug. 6, 1997

Related U.S. Application Data

[63] Continuation of Ser. No. 577,132, Dec. 22, 1995, abandoned.

[51] Int. Cl.$^6$ ..................................................... F16L 23/18
[52] U.S. Cl. ........................... 277/603; 277/610; 277/627
[58] Field of Search .................................... 277/603, 610, 277/627

[56]         References Cited

U.S. PATENT DOCUMENTS

| | | | |
|---|---|---|---|
| Re. 29,702 | 7/1978 | Owen et al. ................................. | 29/520 |
| 1,942,703 | 1/1934 | Hubbard et al. . | |
| 2,520,089 | 8/1950 | Lippincott . | |
| 2,809,080 | 10/1957 | Mittell et al. . | |
| 2,828,987 | 4/1958 | Schmitz . | |
| 3,117,795 | 1/1964 | Price ....................................... | 277/204 |
| 3,132,870 | 5/1964 | Pschera .................................... | 277/204 |
| 3,529,836 | 9/1970 | Hyde . | |
| 3,573,873 | 4/1971 | Pearson .................................... | 277/203 |
| 4,019,244 | 4/1977 | Owen et al. .............................. | 29/520 |
| 4,189,819 | 2/1980 | Nicholson ................................ | 29/417 |
| 4,364,982 | 12/1982 | Gee ........................................ | 277/204 |
| 4,673,187 | 6/1987 | Hanson et al. . | |
| 4,892,320 | 1/1990 | Tuckmantel .............................. | 277/204 |
| 5,161,807 | 11/1992 | Flexitallic ................................ | 277/180 |
| 5,511,797 | 4/1996 | Nikirk et al. ............................. | 277/204 |

*Primary Examiner*—Randolph A. Reese
*Assistant Examiner*—John L. Beres
*Attorney, Agent, or Firm*—Edgar A. Zarins; Malcolm L. Sutherland

[57]         ABSTRACT

A spiral wound gasket able to compress and seal under very low loads and provide sealing capabilities. The gasket generally includes a spiral wound metal portion and an outer guide ring to limit the compression of the gasket. For improved sealing capabilities a flexible graphite material is molded, extruded or layered onto the opposing faces of the gasket. In one embodiment, the graphite material is applied to substantially all of the gasket. In another embodiment, graphite sheets are applied to the outer guide ring while extruded graphite is applied to the outer surfaces of the metal winding. The spiral wound gasket provides a more durable gasket with low sealing load requirements and elimination of buckling under sealing loads.

5 Claims, 2 Drawing Sheets

SPIRAL WOUND GASKET

This is a continuation, of application Ser. No. 08/577,132, filed Dec. 22, 1995, now abandoned.

BACKGROUND OF THE INVENTION

I. Field of the Invention

This invention relates to spiral wound gaskets for sealing between pipe flanges and, in particular, to a spiral wound gasket which incorporates an outer layer of flexible graphite for improved sealing properties under low loads.

II. Description of the Prior Art

Spiral wound gaskets are well known for sealing between pipe flanges in high fluid pressure applications. Typically such gaskets include a spiral winding and a metal guide ring. The spiral winding is usually a profiled metal strip and a sealing material spiral wound upon itself to form a laminated structure which is resilient in a direction perpendicular to the plane of the spiral. The guide ring attached to the spiral winding is designed to prevent over-compression of the spiral winding as the pipe flanges are clamped together and to center the gasket within the flange. A metal support ring may be provided radially inward of the spiral winding to limit compression and buckling. These rings are flat metal rings with a typical thickness less than the non-compressed thickness of the spiral winding.

The metal winding section of prior known spiral gaskets is designed to seal against fluid leakage while the metal guide ring simply limits compression of the gasket and facilitates location of the gasket within the flange. The flat metal guide ring of the prior known gaskets has no sealing function because that is the task of the spiral winding. While the guide ring forms an outer metal annuli, some spiral wound gaskets also include an inner ring to limit compression and inward buckling. Since the inner ring is radially inwardly of the spiral winding seal, it is exposed to the fluids of the pipeline. A corrosive fluid could corrode the inner ring resulting in eventual failure of the gasket. To overcome this problem, an elastomer material has been applied to the ring simply to protect the ring from the corrosive fluid. The elastomer coated inner ring protects the pipe lining material from mechanical damage due to the clamping of the pipe flange while providing a barrier against corrosion. However, the overall function of the elastomer coated inner ring is to limit compression of the pipe flanges against the spiral wound gasket and inward buckling of the gasket.

SUMMARY OF THE PRESENT INVENTION

The present invention overcomes the disadvantages of the prior known spiral wound gaskets by providing an outer layer of flexible graphite for improved sealing capabilities particularly in low load applications.

The general configuration of the spiral wound gasket of the present invention includes a spiral winding formed from alternating layers of a metal strip and gasket material which is compressed between the layers of the metal strip. In a preferred embodiment, the individual bands of the spiral winding have a non-planar profile to act as a spring upon compression within the pipe flange. Secured to the outer periphery of the winding is a flat guide ring with flat graphite seal which together limit the compression of the gasket.

In one embodiment of the invention, the layers of graphite are applied only to the guide ring forming the secondary seal. Instead of layers of graphite on the spiral winding, layers of graphite are incorporated into the winding between the metal strips. The metal portion of the winding has a thickness less than the graphite such that the flexible graphite extends beyond the metal windings forming an outer sealing surface. However, the metal windings of the spiral winding are thicker than the outer guide ring. The graphite layers on the guide ring compress to approximately 50% to 60% of their original thickness before they become substantially solid. The solid guide ring is provided with a material thickness which is less than the width of the metal winding and the graphite layers are applied to both sides of the solid guide ring such that upon compression within the pipe flange, the guide ring and the compressed graphite layers have a material thickness which is equal to the desired thickness of the compressed winding. Thus, a thinner than typical guide ring is used to allow for the thickness of the flexible graphite applied to the opposite faces of the guide ring.

In another embodiment of the present invention, the thickness of the winding is reduced from traditional thicknesses relative to the thickness of the guide ring. The winding thickness is reduced until it is flush with or only slightly thicker than the outer guide ring. This reduced initial thickness limits the degree of compression of the winding thereby reducing buckling. The reduced thickness also allows for a layer of flexible graphite to be attached to each side of the gasket extending from approximately the inside diameter of the winding and across a portion of the outside guide ring. The graphite layer could be applied as a sheet material to opposite sides of the gasket or actually molded over the gasket. Thus, the gasket would comprise a graphite faced spiral wound sealing element as well as a graphite faced solid metal guide ring. The flexible graphite layers could also be extended to any inner ring producing a triple sealing gasket.

These embodiments provide significant advantages over prior known spiral wound gaskets including greater durability than present low load designs, low sealing load requirements, dual or triple sealing surfaces and the reduction or elimination of the tendency of the spiral wound gaskets to buckle towards the inside diameter. The metal portion of the extruded winding is significantly thicker than the guide ring. These advantages are attained while maintaining the compressed thickness of the gasket similar to traditional gaskets or whatever overall compressed thickness is desirable.

Other objects, features and advantages of the invention will be apparent from the following detailed description taken in connection with the accompanying drawings.

BRIEF DESCRIPTION OF THE DRAWING

The present invention will be more fully understood by reference to the following detailed description of a preferred embodiment of the present invention when read in conjunction with the accompanying drawing, in which like reference characters refer to like parts throughout the views and in which.

DETAILED DESCRIPTION OF A PREFERRED EMBODIMENT OF THE PRESENT INVENTION

Figure 1:
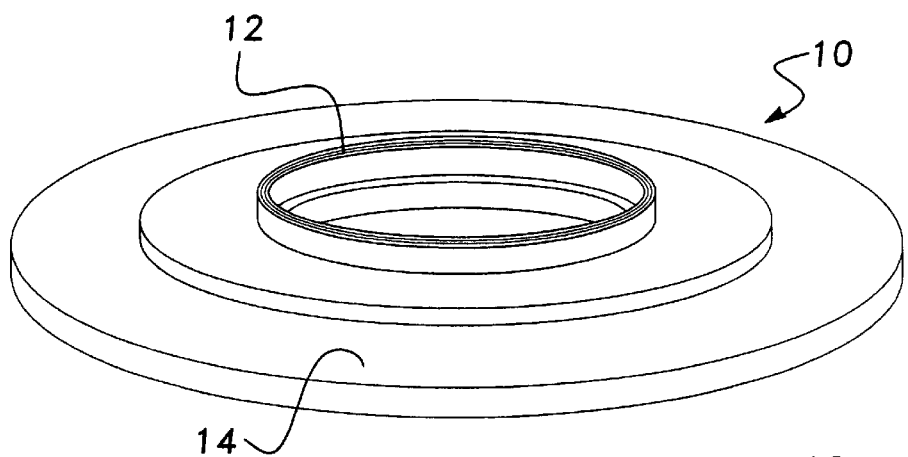
FIG. 1 is a perspective view of a spiral wound gasket embodying the present invention.

Referring first to FIG. 1, there is shown a perspective view of a spiral wound gasket 10 adapted to be disposed between flanges of a pipe or vessel to prevent fluid leakage. Sections of pipe are connected to form a pipeline to direct various fluids from one location to another. To facilitate connection of the pipes, flanges are formed on the ends which may be connected to a subsequent pipe flange using a plurality of bolts. The spiral wound gasket 10 is inserted between the flanges to prevent fluid leakage. As is well known, the gasket 10 generally includes a spiral wound section 12 which provides the sealing capability and a solid guide ring 14 which limits compression and locates the gasket 10 between the pipe flanges.

Figure 2:
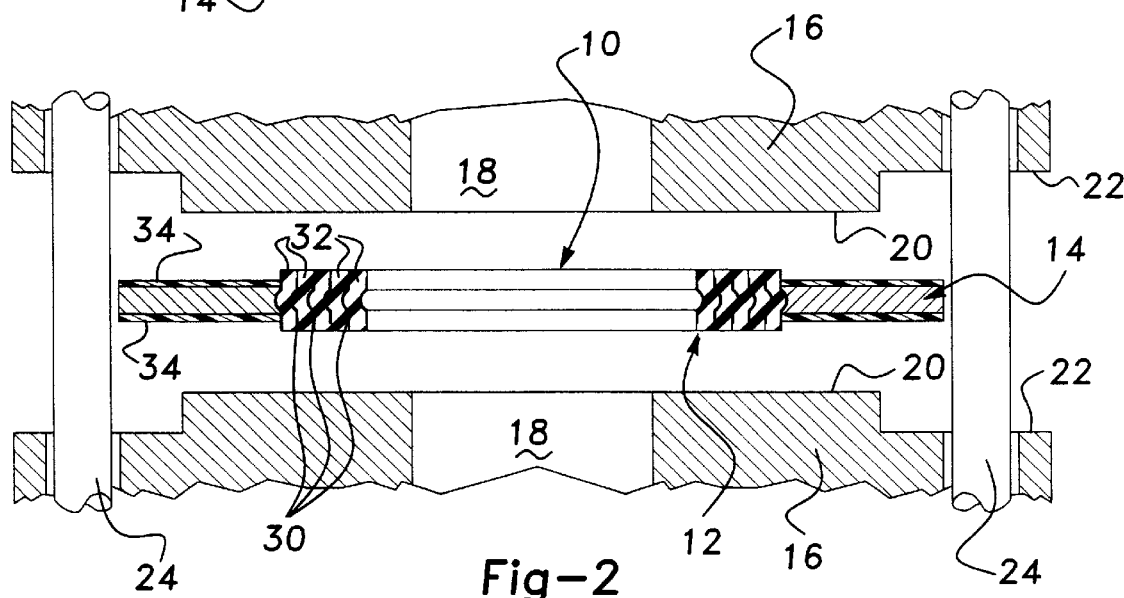
FIG. 2 is a cross-sectional view of a first embodiment of the spiral wound gasket positioned between pipe flanges.
Figure 3:
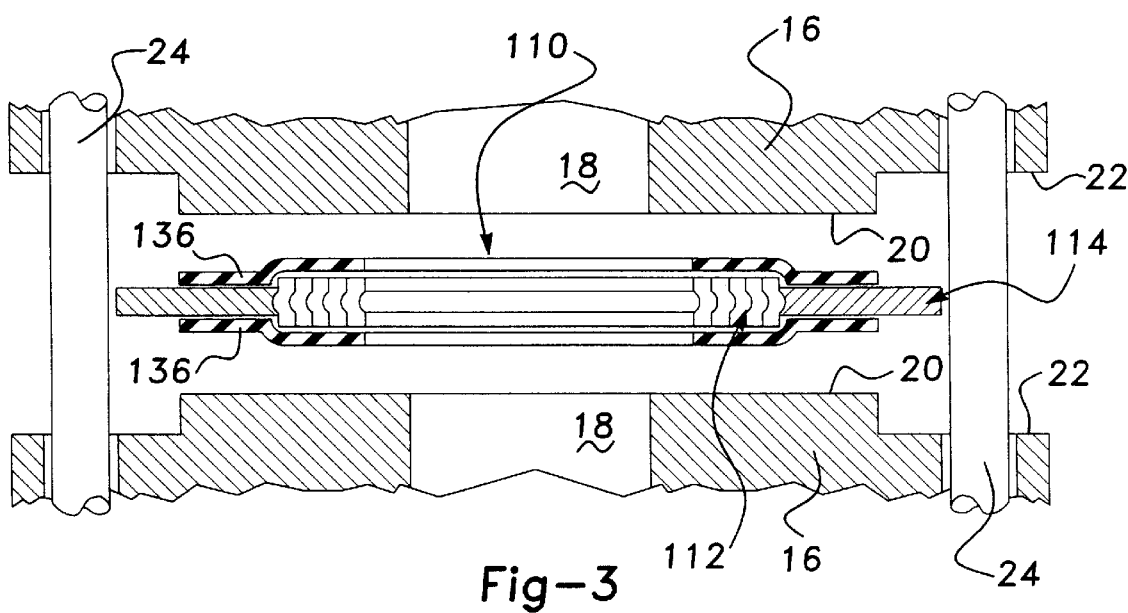
FIG. 3 is a cross-sectional view of a second embodiment of the spiral wound gasket positioned between pipe flanges.
Figure 4:
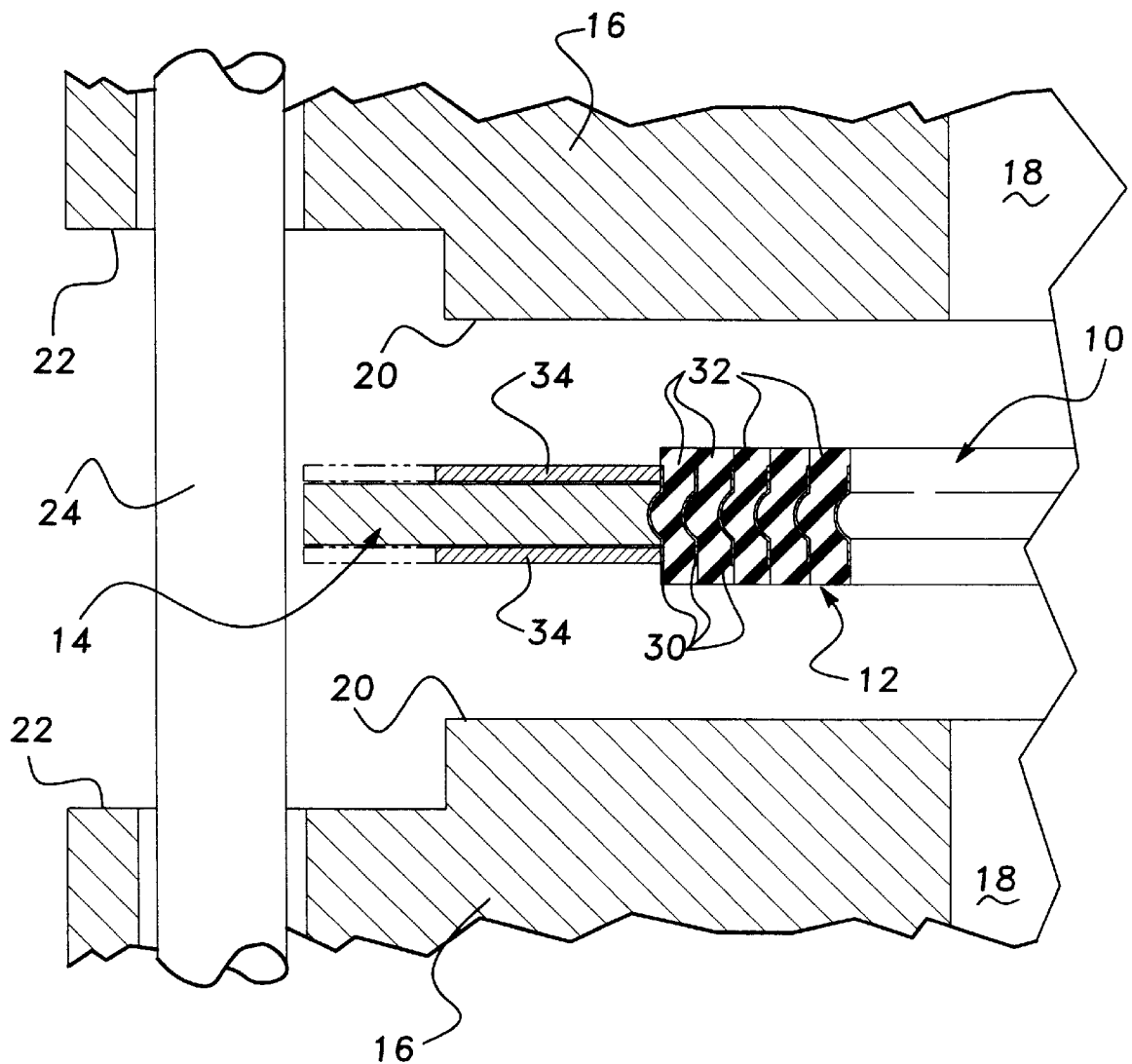
FIG. 4 is an enlarged partial cross-sectional view of the first embodiment of the spiral wound gasket.

FIGS. 2 through 4 illustrate two embodiments of the spiral wound gasket 10 which compresses and seals under very low loads. The spiral wound gasket 10 is disposed between a pair of adjacent pipe flanges 16 each having a throughbore 18 for fluid flow. Typically, the flanges 16 have a raised face 20 creating a peripheral shoulder 22. A plurality of bolts 24 for securing the flanges 16 extend through this peripheral portion such that the necessary loads can be applied to the gasket 10 surrounding the throughbore 18 without interference proximate the bolts 24. The load applied to the gasket 10 sandwiched between the flanges 16 is a result of the tightening of the bolts 24. In some applications, the bolts 24 are not tightened to full torque but the seam between the flanges 16 must still not leak fluids.

Referring now to FIGS. 2 and 4, the gasket 10 includes a winding 12 comprising a metal band or wire 30 having a first predetermined width with a graphite strip 32 of a greater width interspersed between the metal windings 30 to form a laminated winding. The metal strip 30 acts as a resilient supporting material and preferably has a curved profile to act as a spring and provide resilient biasing during compression. In a preferred embodiment, the metal winding 30 has a width of between 0.120 inches and 0.160 inches while the graphite strip 32 has a width of between 0.160 and 0.200 inches depending upon the application. The width of the metal winding 30 is significantly greater than the thickness of the metal guide ring 14.

The guide ring 14 and the layers of graphite limit the compression of the winding 12 by acting as a hard stop between the flanges 16. The thickness of the guide ring 14 of the present invention is reduced from the typical guide ring thickness such that layers of graphite 34 may be applied to the opposite surfaces of the guide ring 14 while maintaining the proper compressed thickness of the gasket. In the preferred embodiment, the metal portion of the guide ring 14 has a width or thickness of between 0.075 inches and 0.125 inches depending upon the application However, the metal winding of the spiral winding are thicker than the outer guide ring. The graphite layers on the guide ring compress to approximately 50% to 60% of their original thickness before they become substantially solid. The solid guide ring is provided with a material thickness which is less than the width of the metal winding and the graphite layers are applied to both sides of the solid guide ring such that upon compression within the pipe flange, the guide ring and the compressed graphite layers have a material thickness which is equal to the proper thickness of the compressed winding. Thus, a thinner than typical guide ring is used to allow for the thickness of the flexible graphite applied to the opposite faces of the guide ring. The graphite 34 applied to the outer ring 14 acts as a secondary seal in conjunction with the primary seal formed by the winding 12 of metal and graphite. The graphite 34 forming the secondary seal may be applied in sheets to the opposite faces of the guide ring 14 or molded directly over all or part of the guide ring 14 substantially encapsulating the outer guide ring 14. While it is contemplated that the graphite layers 34 would only need to be applied to the guide ring 14 to the extent of the raised face 20 of the flanges 16, completely covering the guide ring 14 may be preferred.

Referring now to FIG. 3, an alternative embodiment of the dual seal gasket 110 of the present invention is shown. The overall gasket 110 is similar to well known gaskets except that the thickness of the winding 112 is reduced. At one extreme, the winding 112 is thinner than the outer guide ring 114. Preferably, the winding 112 is of the same thickness or slightly thicker than the outer ring 114. This reduced thickness means that the winding 112 would be compressed a small percentage of its initial thickness before the guide ring 114 and flexible graphite layers prevent further compression between the flanges 16. To provide improved sealing capabilities, a layer of flexible graphite 136 is applied to both faces of the gasket 110. In one form, a ring of graphite 136 would be attached to each side of the gasket 110. As an alternative, the graphite 136 may be molded over the gasket 110. The graphite 136 is applied to extend from an inside diameter of the winding 112 (or inner ring) to a position on the outer guide ring 114 aligned with the raised face 20 of the flanges 16. Alternatively, the flexible graphite may completely encapsulate the gasket or extend over only a portion of the gasket faces.

The spiral wound gaskets 10,110 of the present invention provide dual sealing gaskets with distinct advantages including low sealing load requirements, and reduction or elimination of the tendency of spiral wound gaskets to buckle toward the inside diameter. With the graphite layers, the compressed thickness of the gasket would be similar to prior known gaskets.

The foregoing detailed description has been given for clearness of understanding only and no unnecessary limitations should be understood therefrom as some modifications will be obvious to those skilled in the art without departing from the scope and spirit of the appended claims.

What is claimed is:

1. A spiral wound gasket for low load sealing of a fluid conductor, said gasket comprising:

multiple windings forming a spiral gasket ring with outwardly disposed surfaces, said spiral gasket ring including interspersed windings of metal and a gasket material, said spiral ring having a predetermined thickness;

an outer guide ring mounted to an outer periphery of said spiral gasket ring, said guide ring having outwardly disposed flat surfaces; and layers of flexible graphite applied to at least a portion of each said flat surfaces of said outer guide ring and at least a portion of each said outwardly disposed surfaces of said spiral gasket ring, said guide ring and layers of flexible graphite limiting compression of said spiral gasket ring.

2. The gasket as defined in claim 1 wherein said layers of flexible graphite are applied in sheets to opposite sides of said gasket.

3. The gasket as defined in claim 1 wherein said layers of flexible graphite are molded over said gasket.

4. The gasket as defined in claim 3 wherein the thickness of said gasket ring is greater than the thickness of said outer guide ring, said layers of flexible graphite applied to said spiral gasket ring and guide ring forming a graphite faced spiral wound sealing element.

5. The gasket as defined in claim 3 wherein said outer guide ring has an axial thickness in the range of 0.075 to 0.125 inches, said metal windings having an axial width in the range of 0.120 to 0.160 inches, and said graphite windings having an axial width in the range of 0.160 to 0.200 inches.

* * * * *